United States Patent
U et al.

(10) Patent No.: US 11,483,269 B2
(45) Date of Patent: Oct. 25, 2022

(54) MESSAGE-BASED PRESENTATION OF MICROAPP USER INTERFACE CONTROLS

(71) Applicant: Citrix Systems, Inc., Fort Lauderdale, FL (US)

(72) Inventors: Shruthi U, Bangalore (IN); Aayush Agarwal, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/122,164

(22) Filed: Dec. 15, 2020

(65) Prior Publication Data
US 2022/0191160 A1    Jun. 16, 2022

(51) Int. Cl.
*H04L 51/18* (2022.01)
*H04L 51/58* (2022.01)
*H04L 51/42* (2022.01)

(52) U.S. Cl.
CPC .......... *H04L 51/18* (2013.01); *H04L 51/42* (2022.05); *H04L 51/58* (2022.05)

(58) Field of Classification Search
CPC .......... H04L 51/18; H04L 51/22; H04L 51/38
See application file for complete search history.

(56) References Cited

U.S. PATENT DOCUMENTS

| 11,082,373 | B1* | 8/2021 | Kochhar | H04L 51/06 |
|---|---|---|---|---|
| 2012/0054289 | A1 | 3/2012 | Aytulu et al. | |
| 2014/0052797 | A1 | 2/2014 | Lessard et al. | |
| 2014/0280641 | A1 | 9/2014 | Gary et al. | |
| 2015/0319586 | A1* | 11/2015 | Jin | H04L 51/12 455/466 |
| 2016/0344677 | A1* | 11/2016 | MacDonald | H04L 51/22 |
| 2017/0034091 | A1* | 2/2017 | Egilmez | H04L 51/063 |
| 2017/0149703 | A1 | 5/2017 | Willett et al. | |
| 2019/0065033 | A1* | 2/2019 | Kulkarni | H04L 51/22 |
| 2019/0140995 | A1 | 5/2019 | Roller et al. | |
| 2019/0311295 | A1 | 10/2019 | Weber et al. | |

OTHER PUBLICATIONS

International Search Report and Written Opinion dated Feb. 24, 2022 for International Patent Application No. PCT/US2021/058521.

* cited by examiner

*Primary Examiner* — Ryan J Jakovac
(74) *Attorney, Agent, or Firm* — Pierce Atwood LLP

(57) ABSTRACT

In some implementations, a method may involve determining, by a computing system, that a first message sent by a system of record for delivery to a client device is indicative of a first action that can be taken with respect to the system of record. The computing system may determine at least one user interface (UI) element that is selectable to cause the system of record to take the first action, and may generate, based at least in part on the first message being indicative of the first action, at least one command that causes the client device to present the at least one UI element.

20 Claims, 15 Drawing Sheets

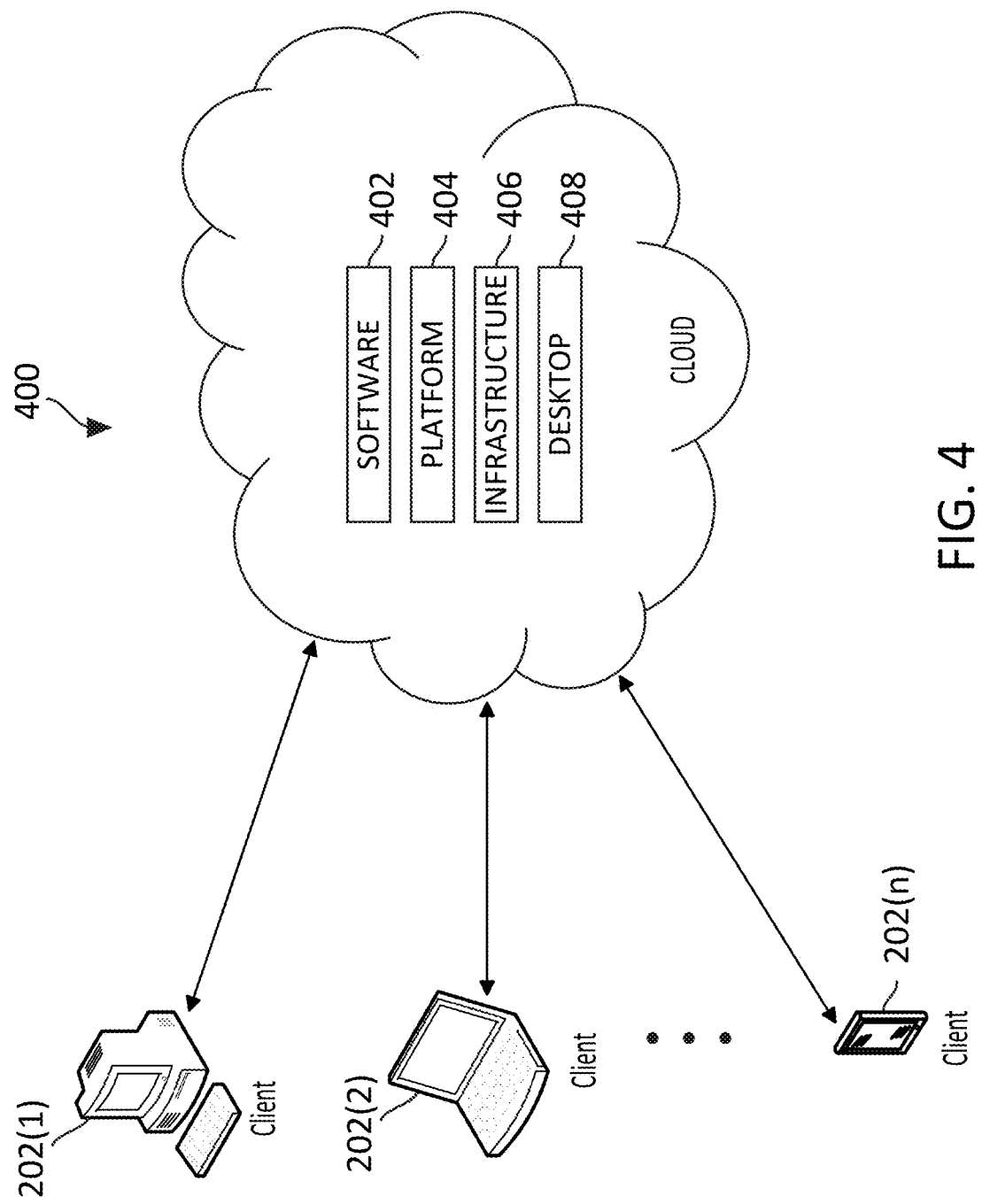

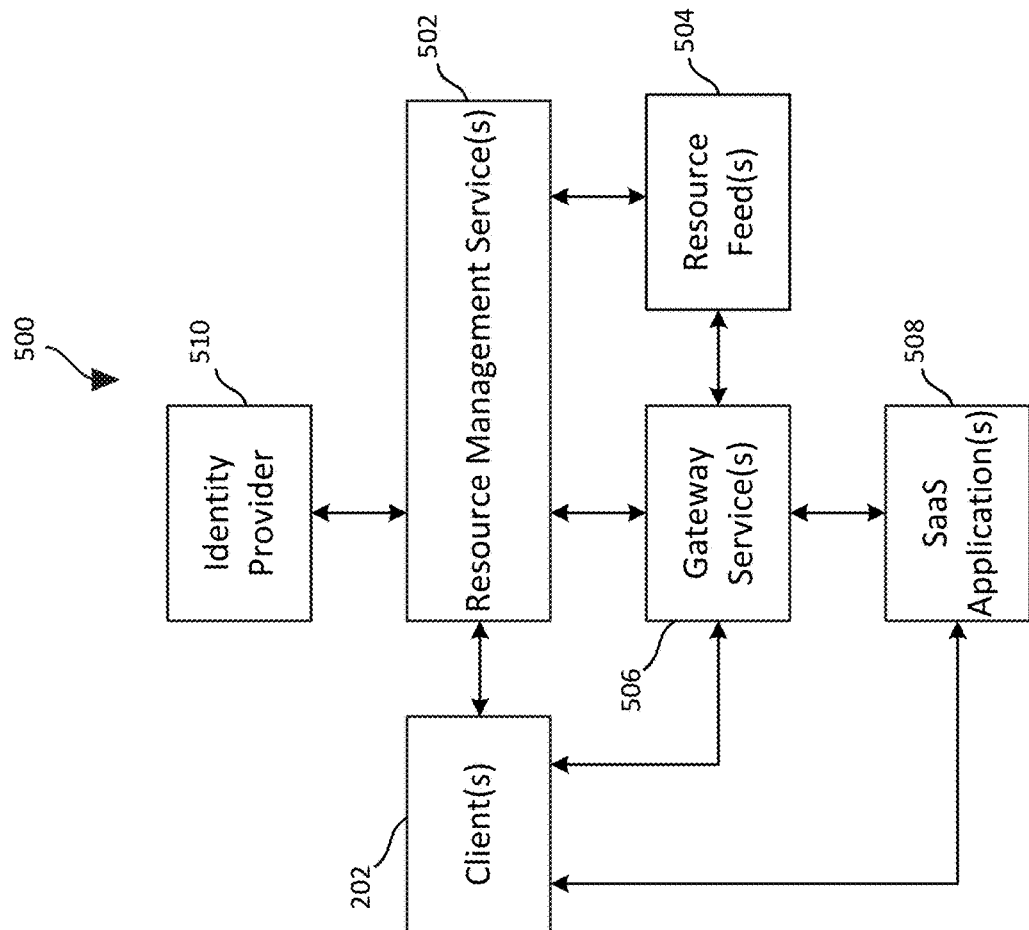

US 11,483,269 B2

MESSAGE-BASED PRESENTATION OF MICROAPP USER INTERFACE CONTROLS

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves determining, by a computing system, that a first message sent by a system of record for delivery to a client device is indicative of a first action that can be taken with respect to the system of record. The computing system determines at least one user interface (UI) element that is selectable to cause the system of record to take the first action, and generates, based at least in part on the first message being indicative of the first action, at least one command that causes the client device to present the at least one UI element.

In some disclose embodiments, a system includes at least one processor, and at least one computer-readable medium encoded with instructions which, when executed by the at least one processor, cause the system to determine that a first message sent by a system of record for delivery to a client device is indicative of a first action that can be taken with respect to the system of record, to determine at least one user interface (UI) element that is selectable to cause the system of record to take the first action, and to generate, based at least in part on the first message being indicative of the first action, at least one command that causes the client device to present the at least one UI element.

In some disclose embodiments, at least one non-transitory computer-readable medium encoded with instructions which, when executed by at least one processor of a system, cause the system to determine that a first message sent by a system of record for delivery to a client device is indicative of a first action that can be taken with respect to the system of record, to determine at least one user interface (UI) element that is selectable to cause the system of record to take the first action, and to generate, based at least in part on the first message being indicative of the first action, at least one command that causes the client device to present the at least one UI element.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 4 is a schematic block diagram of a cloud computing environment in which various aspects of the disclosure may be implemented;

FIG. 5A is a block diagram of an example system in which resource management services may manage and streamline access by clients to resource feeds (via one or more gateway services) and/or software-as-a-service (SaaS) applications;

DETAILED DESCRIPTION

Figure 1A:
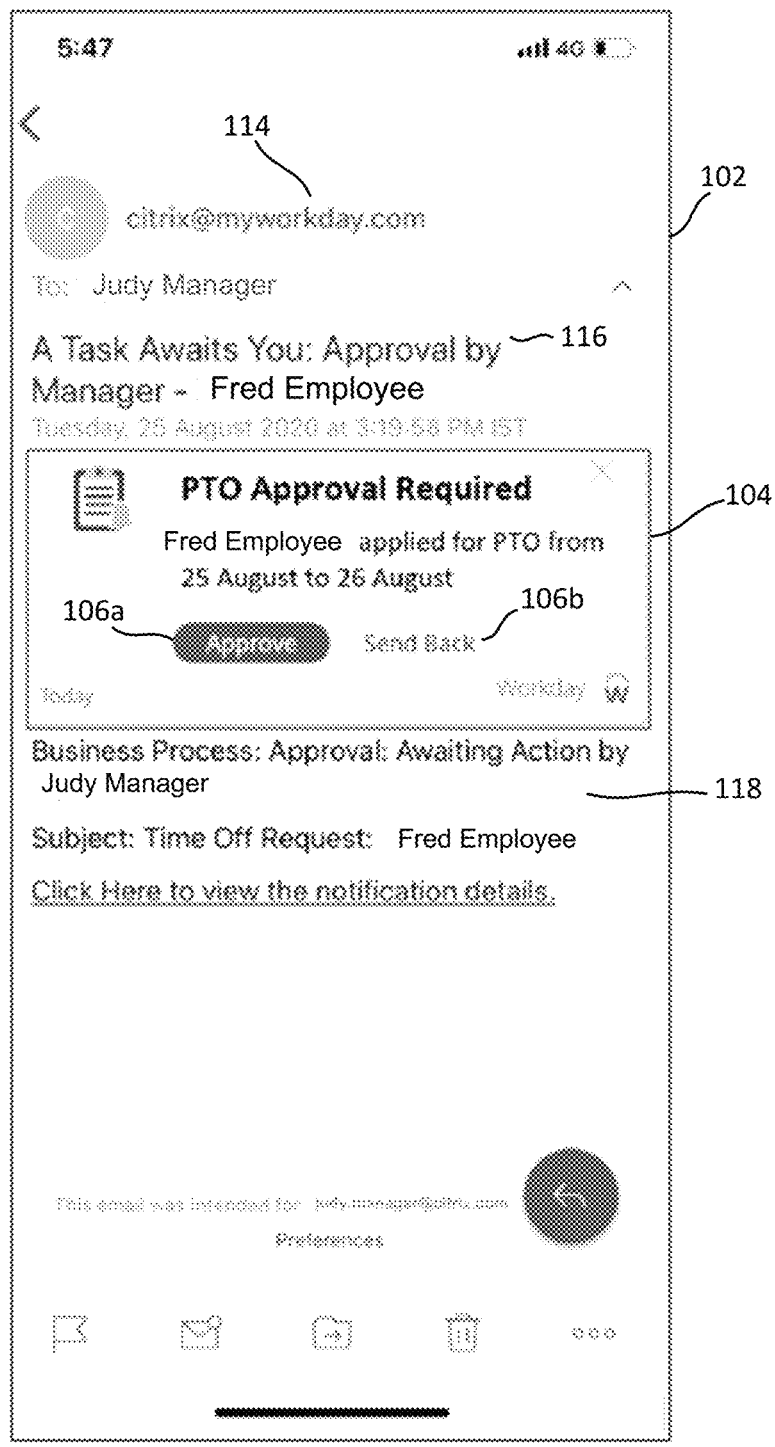
FIG. 1A shows an example email message enhanced to include microapp user interface elements in accordance with some aspects of the present disclosure.

For purposes of reading the description of the various embodiments below, the following descriptions of the sections of the specification and their respective contents may be helpful:

Section A provides an introduction to example embodiments of a system for presenting microapp user interface controls based on messages;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of example embodiments of the system for presenting microapp user interface controls based on messages that was introduced above in Section A; and Section G describes example implementations of methods, systems/devices, and computer-readable media in accordance with the present disclosure.

A. Introduction to Illustrative Embodiments of a System for Presenting Microapp User Interface Controls Based on Messages Nowadays, it is common for users to interact with many different systems of record (e.g., Software-as-a-Service (SaaS) applications, web applications, Windows applications, Linux applications, desktops, file repositories and/or file sharing systems, and other data delivery systems) to accomplish day-to-day work tasks. The multi-resource access system 500 described below (in Section E) in connection with FIGS. 5A-D is an example of an infrastructure that may provide a user 524 with streamlined access to multiple different such systems of record 526. As Section E describes in connection with FIGS. 5B and 5C, after a user 524 operates the resource access application 522 to authenticate to the resource management services 502 (e.g., via the identity service 516 and the identity provider 510), the resource management services 502 may enable the user 524 to seamlessly access any of a number of systems of record 526 through the resource access application 522 without having to separately input authentication credentials for the respective systems of record 526. One system of record 526 to which the user 524 may be automatically authenticated in this manner is a messaging application 602 (shown in FIG. 6) that resides on or is otherwise executed under the control of a client device 202. In some implementations, the messaging application 602 may, for example, be the Citrix Secure Mail application offered by Citrix Systems, Inc., of Fort Lauderdale, Fla.

Various systems of record 526, and most notably SaaS applications, frequently send messages (e.g., electronic mails (emails), short message service (SMS) messages, etc.) to notify users about events that have occurred with respect to their accounts and/or to inform the users about actions the users may want to take with respect to such accounts. For example, a human resources SaaS application (e.g., Workaday) may send a manager one or more emails informing the manager that an employee has submitted a personal time off (PTO) request in need of attention (e.g., by approving, denying or otherwise addressing the request). When a user receives such a message, the user may decide to launch the application that sent the email (by clicking on a link in the message or otherwise), enter authentication credentials for the application, navigate to a page or other portion of the application to which the message relates, and then interact with the application to take an appropriate action.

The inventors have recognized and appreciated that this process, in which a user 524 is required to change context from the messaging application 602 (e.g., an email client) to another application to take a desired action with respect to a system of record 526 (e.g., a SaaS application), can be inefficient and burdensome for the user 524.

Offered is a system capable of evaluating messages sent to a user 524 (e.g., to a messaging application 602) to identify those messages that are indicative of actions that can be taken with respect to systems of record 526, and causing a messaging application 602 of a client device 202 to present one or more user interface (UI) elements that enable the user 524 to seamlessly take the indicated actions with respect to the systems of record 526.

As shown in FIG. 1A, for example, in some implementations, the messaging application 602 may present such microapp UI elements by rendering an email 102 to include an enhancement 104 that includes one or more selectable microapp UI elements 106*a*, 106*b*. As explained in more detail below, selection of one of the microapp UI elements 106*a*, 106*b* may result in a message being sent to the microapp service 528 (shown in FIG. 5C), and that message may trigger a microapp for the system of record 526 to access the user's authentication credentials for that system of record 526 (e.g., via the credential wallet service) and instruct the data integration provider service 530 to take the indicated action with respect to the system of record 526 on behalf of the user 524. Accordingly, the recipient of the email 102 may take a desired action with respect to the system of record 526 that sent the email 102 simply by clicking on or otherwise selecting one of the microapp UI elements 106*a*, 106*b* that are embedded in the email 102.

Figure 1B:
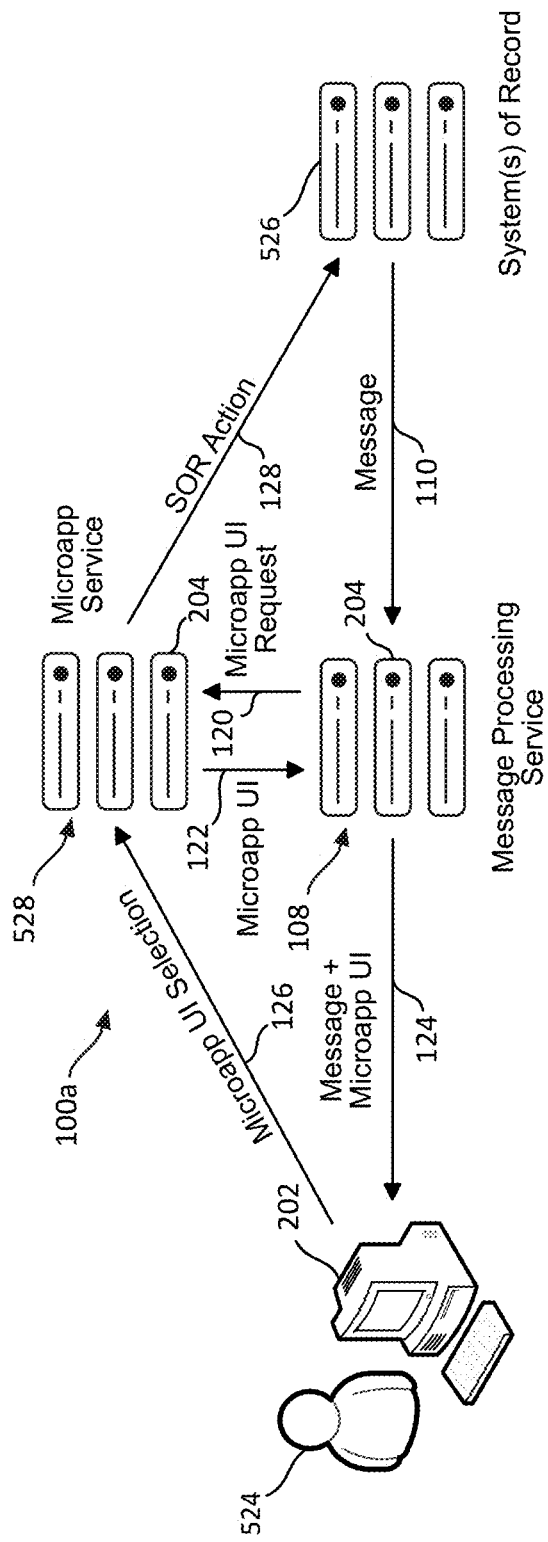
FIG. 1B shows a high-level implementation of a first example system that may be employed to render a message that includes embedded microapp UI controls, such as the example email shown in FIG. 1A.

FIG. 1B shows a high-level implementation of a first example system 100*a* that may be employed to render a message that includes embedded microapp UI controls, such as the email 102 (including the enhancement 104) shown in FIG. 1A. As shown, in some implementations the system 100*a* may include a message processing service 108 as well as the microapp service 528 (describe below in connection with FIG. 5C). The message processing service 108 and the microapp service 528 may each be implemented using one or more servers 204 (examples of which are described below). In some implementations, the message processing service 108 may include an email server, such as a Microsoft Exchange Server. Further, as explained in more detail below, in some implementations, the message processing service 108 may additionally include one or more servers 204 that are included within or operate in conjunction with the analytics service 536 (shown in FIG. 5C).

As illustrated, the message processing service 108 may receive incoming messages 110 (e.g., emails) sent by a system of record 526 (e.g., a SaaS application) that are addressed to an account of the user 524. For example, in implementations in which the message processing service 108 includes an email server, the email server may receive and process emails with addresses corresponding to a particular internet domain name, e.g., "citrix.com." Rather than simply delivering the incoming messages 110 to the client device 202 (e.g., to a messaging application 602) indicated by the address (e.g., based on the local-part of an email address), however, the message processing service 108 may first evaluate one or more characteristics of the incoming messages 110 to determine whether they are indicative of actions that the user 524 may want to take with respect to the systems of record 526. With reference to the email 102 shown in FIG. 1A, for example, the message processing service 108 may evaluate the source of the email 102 (e.g., by referencing the "from" metadata 114), the topic of the email 102 (e.g., by referencing the "subject" metadata 116), and/or the content of the email 102 (e.g., by referencing the text or other information within the body 118 of the email 102) to identify information that indicates the email 102 relates to one or more actions that can be taken with respect to the system of record 526 from which the email 102 originated. Incoming messages 110 that meet such criteria may be referred to as "actionable" messages.

As shown in FIG. 1B, in the event that the message processing service 108 determines that an incoming message 110 is actionable, the message processing service 108 may send a request 120 to the microapp service 528 for UI controls (e.g., microapp UI elements 106a, 106b) that can be embedded within the incoming message 110 to allow the user 524 to seamlessly take the indicated action(s). In some implementations, the message processing service 108 may be configured to recognize particular patterns of data and/or metadata within incoming messages 110 as corresponding to particular actions (or categories of actions, e.g., a "PTO request" category may imply both "approve" and "deny" actions) that may be taken with respect to particular systems of record 526, and may identify those actions (or categories) in the request 120. In response, the microapp service 528 may return (e.g., via a response 122) the applicable microapp UI elements 106 and/or a UI window that includes such microapp UI elements 106.

In some implementations, the microapp service 528 may identify an existing microapp for enabling the action(s) indicated by the request 120, and may return one or more corresponding microapp UI elements 106 and/or a UI window for that microapp. For example, in some implementations, the analytics service 536 (shown in FIG. 5C) may have previously detected an actionable event within a system of record 526 and generated a notification 546 for that event which included one or more selectable microapp UI elements 548 (shown in FIG. 5D). In some implementations, those same microapp UI elements 548 may be provided to the message processing service 108 (e.g., via the response 122) for inclusion in an enhanced message (e.g., the email 102 including the enhancement 104) as selectable UI element(s) 106. In some implementations, upon determining that a received incoming message 110 is actionable, the message processing service 108 may request that the data integration provider service 530 perform a sync with the system of record 526 from which the message originated so as to trigger the analytics service 536 to generate a notification 546 including the UI element(s) 548 for the actionable event, in case such a notification 546 has not already been generated at the time the incoming message 110 is received. In such implementations, the message processing service 108 may thus rely upon operations already performed by the analytics service 536, together with the microapp service 528, to configure the microapp UI elements 548 to enable the microapp service 528 to take the appropriate actions with respect to the systems of record 526. In other words, in such implementations, the message processing service 108 may simply request and receive from the microapp service 528, as the UI element(s) 106, one or more of the microapp UI elements 548 that were previously configured to take the indicated actions in connection with a notification 546 relating to the same actionable event.

In other implementations, the process used to build and/or select microapp UI elements 106 and/or a UI window for an incoming message 110, such as the enhancement 104 shown in FIG. 1A, may instead be separate from but similar to the process the analytics service 536 and microapp service 528 use to build UI windows and/or select microapp UI elements for event notifications 546, as described below in connection with FIGS. 5C and 5D.

In any event, as shown in FIG. 1B, after determining the appropriate UI element(s) 106 to include in an actionable incoming message 110, the message processing service 108 may embed those microapp UI elements 106 within the incoming message 110 to generate an enhanced message 124 that may be sent to the client device 202. Upon the user 524 selecting one of the microapp UI elements 106 in the enhanced message 124, the client device 202 may send an indication 126 to the microapp service 528 that triggers the microapp service 528 to send an instruction 128 to the corresponding system of record 526 (e.g., via an API) to take the indicated action on behalf of the user 524.

Figure 1C:
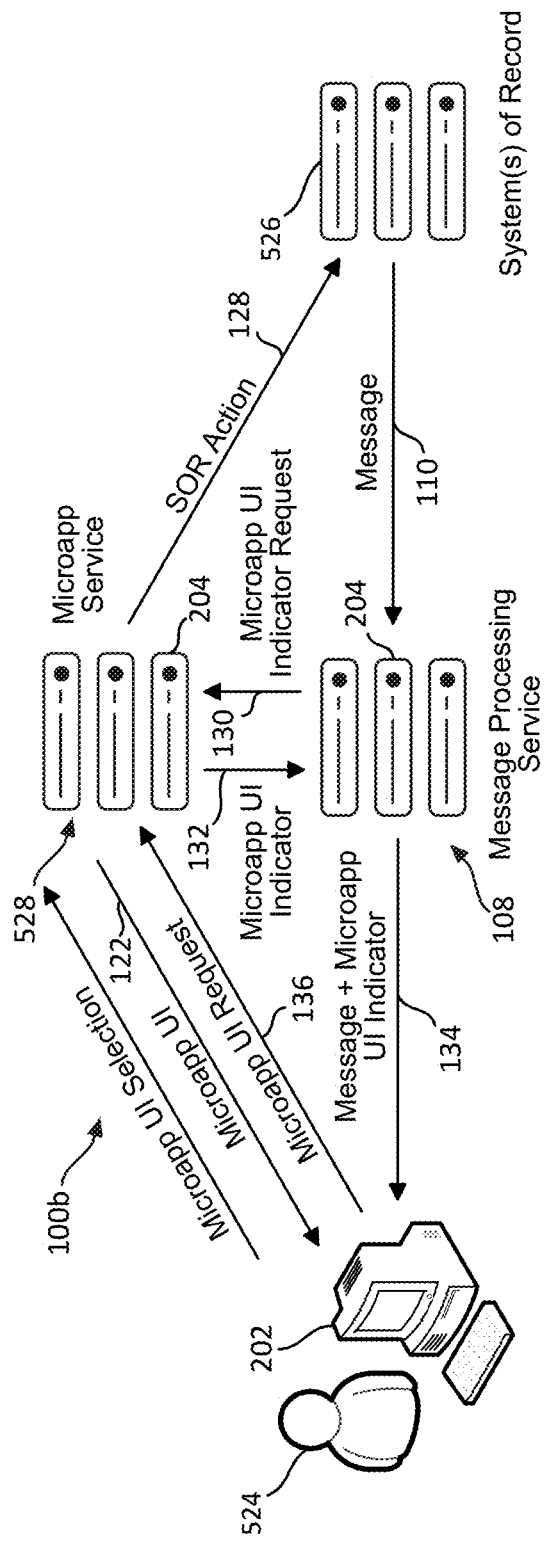
FIG. 1C shows a high-level implementation of a second example system that may be employed to render a message that includes embedded microapp UI controls, such as the example email shown in FIG. 1A.

FIG. 1C shows a high-level implementation of a second example system 100b that may be employed to render an enhanced message that includes microapp UI elements 106, such as the email 102 (including the enhancement 104) shown in FIG. 1A. The system 100b is similar in many respects to the system 100a described above. In the system 100b, however, rather than sending a request 120 to the microapp service 528 for UI controls to embed in the incoming message 110 to generate the enhanced message 124, the message processing service 108 may send a request 130 to the microapp service 528 for an indicator of microapp UI controls for performing one or more actions. As illustrated, in response to the request 130, the microapp service 132 may return a response 132 that includes an indicator of the requested microapp UI controls to the message processing service 108, rather than the UI controls themselves. The message processing service 108 may then embed the received indicator in the incoming message 110 to generate an enhanced message 134 that may be sent to the client device 202. Upon receiving the enhanced message 134, a messaging application of the client device 202 (e.g., the messaging application 602 shown in FIG. 6) may, based on the embedded microapp UI control indicator, send a request 136 to the microapp service 528 for the microapp UI controls identified by the indicator 132, and the microapp service 528 may return a response 122 including the applicable microapp UI elements 106 and/or a UI window that includes such microapp UI elements 106. The messaging application may then render a version of the incoming message 110 (e.g., the email 102 shown in FIG. 1A) that includes an enhancement 104 in which the applicable microapp UI elements 106 are presented for possible selection by the user 524. In some implementations, the messaging application may determine not to include the enhancement 104 in the rendered version of the message (based on the embedded microapp UI indicator) if the messaging application determines that a trust relationship has not been established between the messaging application and the microapp service 528, such as where the user 524 has not been authenticated to both applications via the single-sign on service 520 (shown in FIG. 5B) or otherwise.

As explained in more detail below, in some implementation, some or all of the logic for processing the incoming messages 110 to identify actionable messages and/or to determine appropriate microapp UI controls to embed within such messages may reside at the client device 202, rather than at one or more servers 204. For example, in some implementations, a messaging application at the client device 202 (e.g., the messaging application 602) may be configured to identify potentially actionable messages by performing a first level of analysis on newly-received messages, and may send those potentially actionable messages to the message processing service 108 for further analysis to determine whether is appropriate to cause the messaging application to present on more selectable microapp UI elements 106. For individual messages the message processing service 108 determines are actionable, the message processing service 108 may, for example, embed one or more microapp UI elements 106 (or indicators of the same)

in an enhanced message 124, 134 sent back to the client device 202 (e.g., using the process described above) and/or may instruct the messaging application to present the applicable microapp UI elements 106 in some other manner, such as by presenting a pop-up window, or by indicating options for selecting the microapp UI elements 106 in a toolbar or other widget of the messaging application. Such an implementation may be particular useful for certain types of messages, such as SMS messages. For instance, in some implementations, the messaging application (e.g., the messaging application 602) may be given permission to "listen" to incoming SMS messages, and may send the content of newly-received SMS messages meeting one or more threshold criteria to the message processing service 108 for further processing, as just described.

Additional details and example implementations of embodiments of the present disclosure are set forth below in Section F, following a description of example systems and network environments in which such embodiments may be deployed.

B. Network Environment

Figure 2:
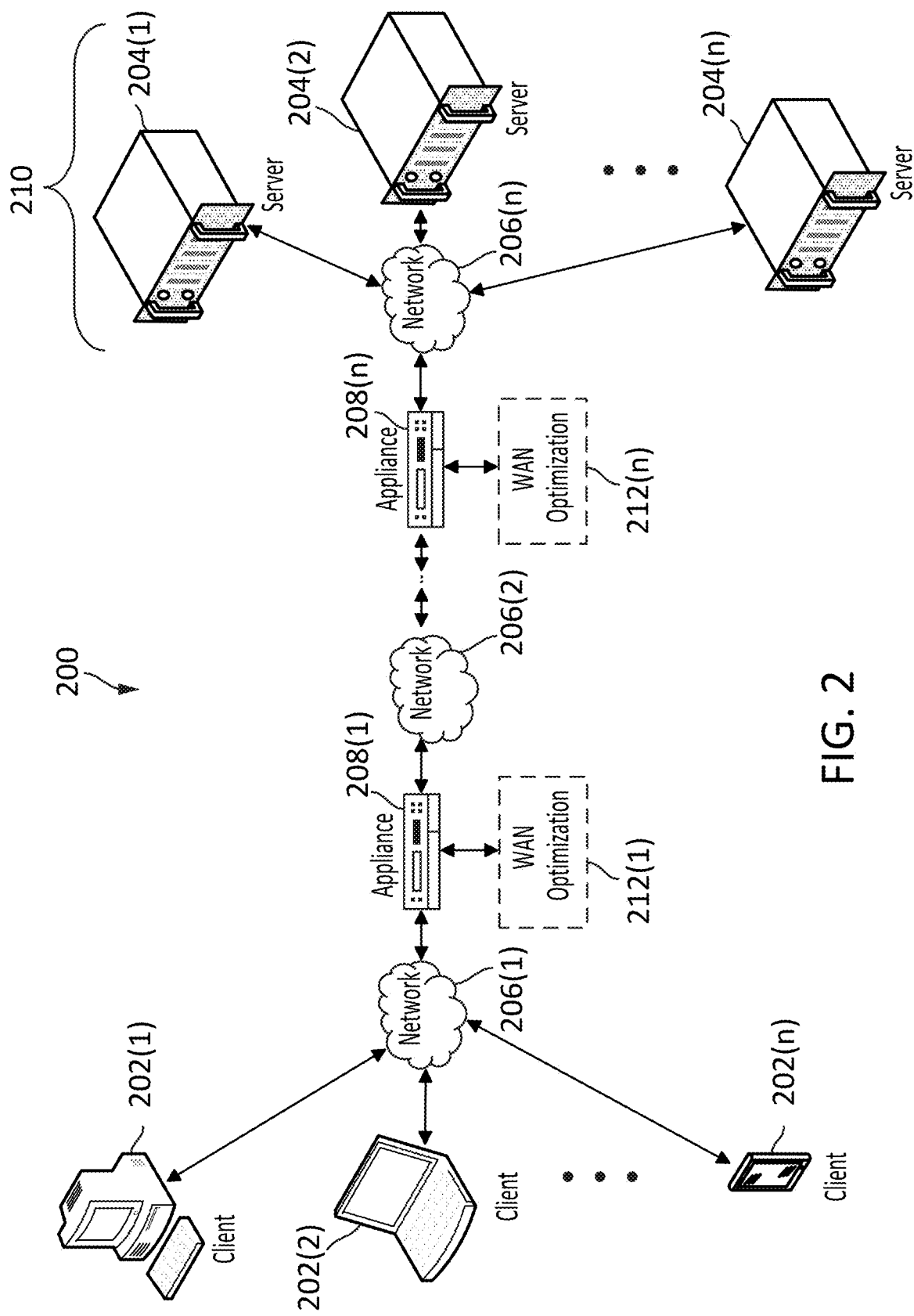
FIG. 2 is a diagram of a network environment in which some embodiments of the system for presenting microapp user interface controls based on messages disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of + an organization.

C. Computing Environment

Figure 3:
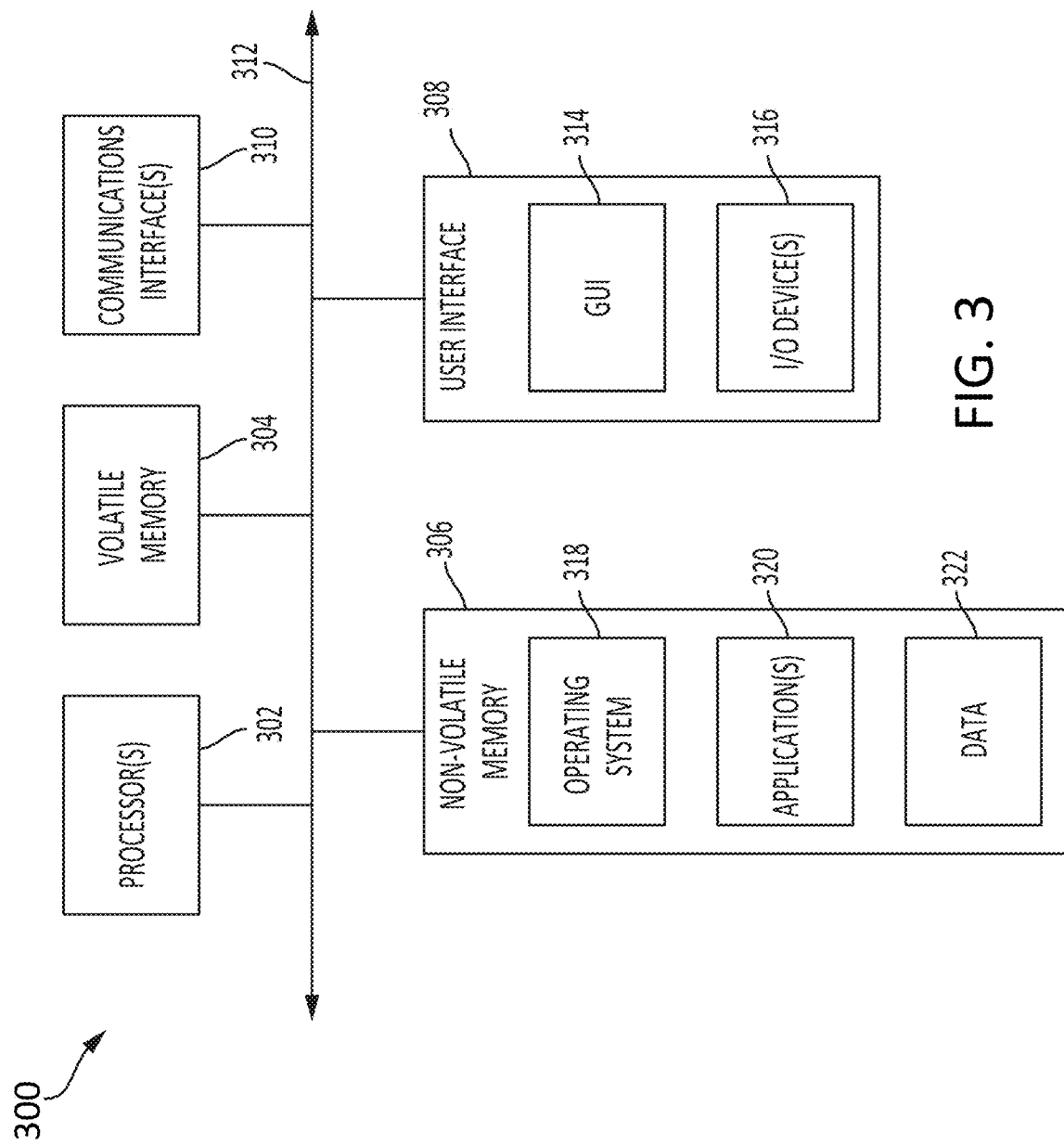
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by Amazon.com, Inc., of Seattle, Wash., Azure IaaS provided by Microsoft Corporation or Redmond, Wash., RACKSPACE CLOUD provided by Rackspace US, Inc., of San Antonio, Tex., Google Compute Engine provided by Google Inc. of Mountain View, Calif., and RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
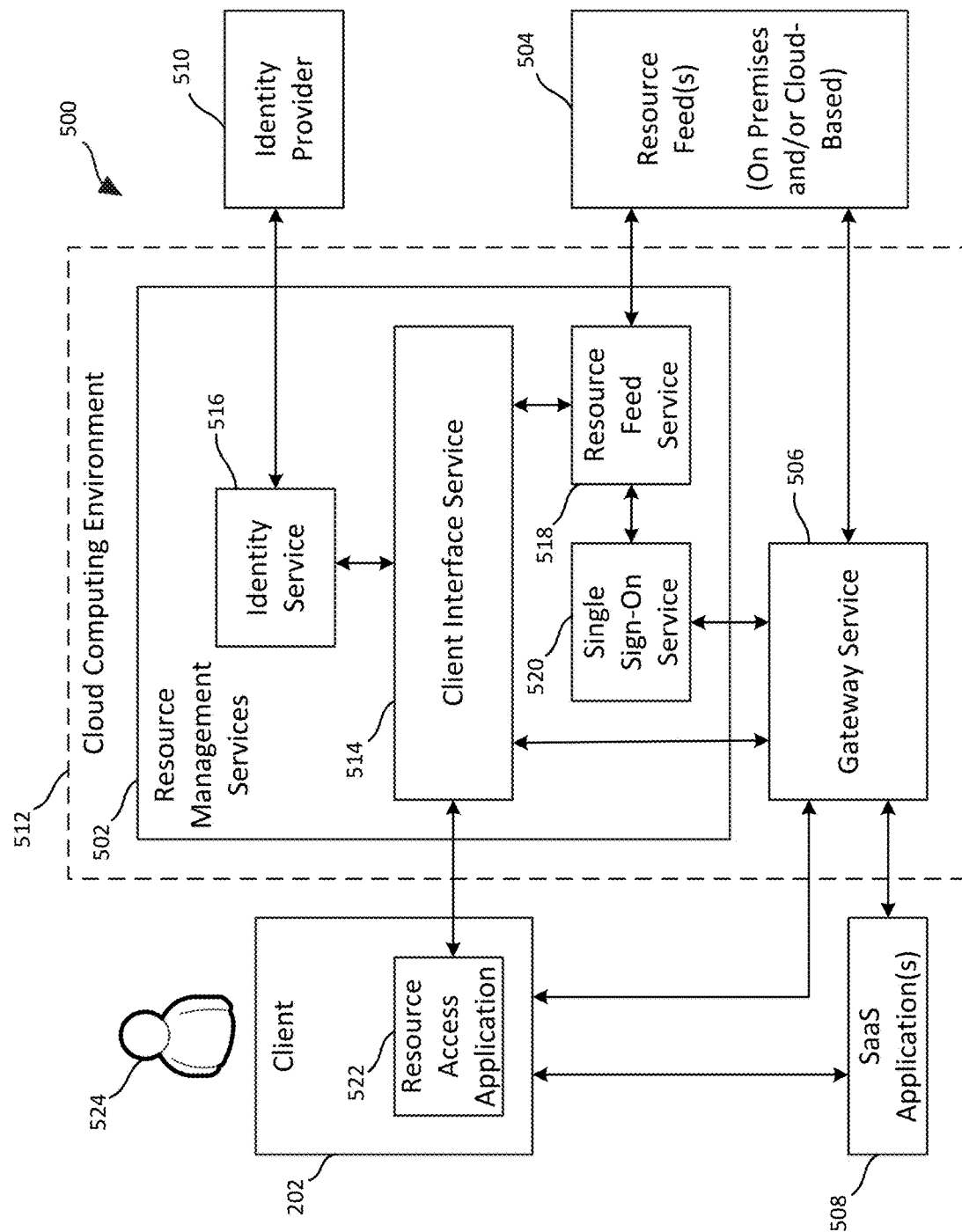
FIG. 5B is a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Figure 5C:
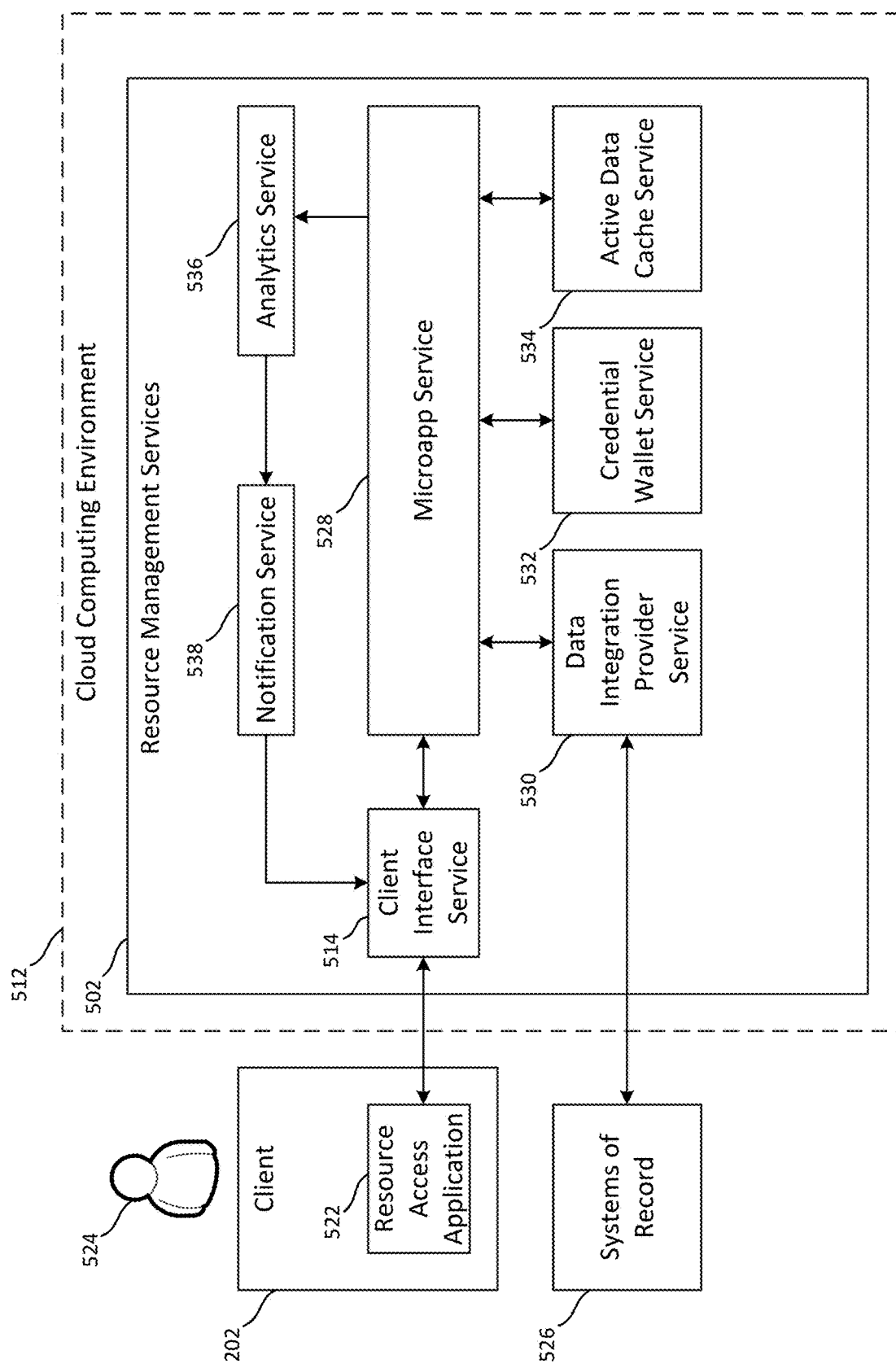
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and XML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Figure 5D:
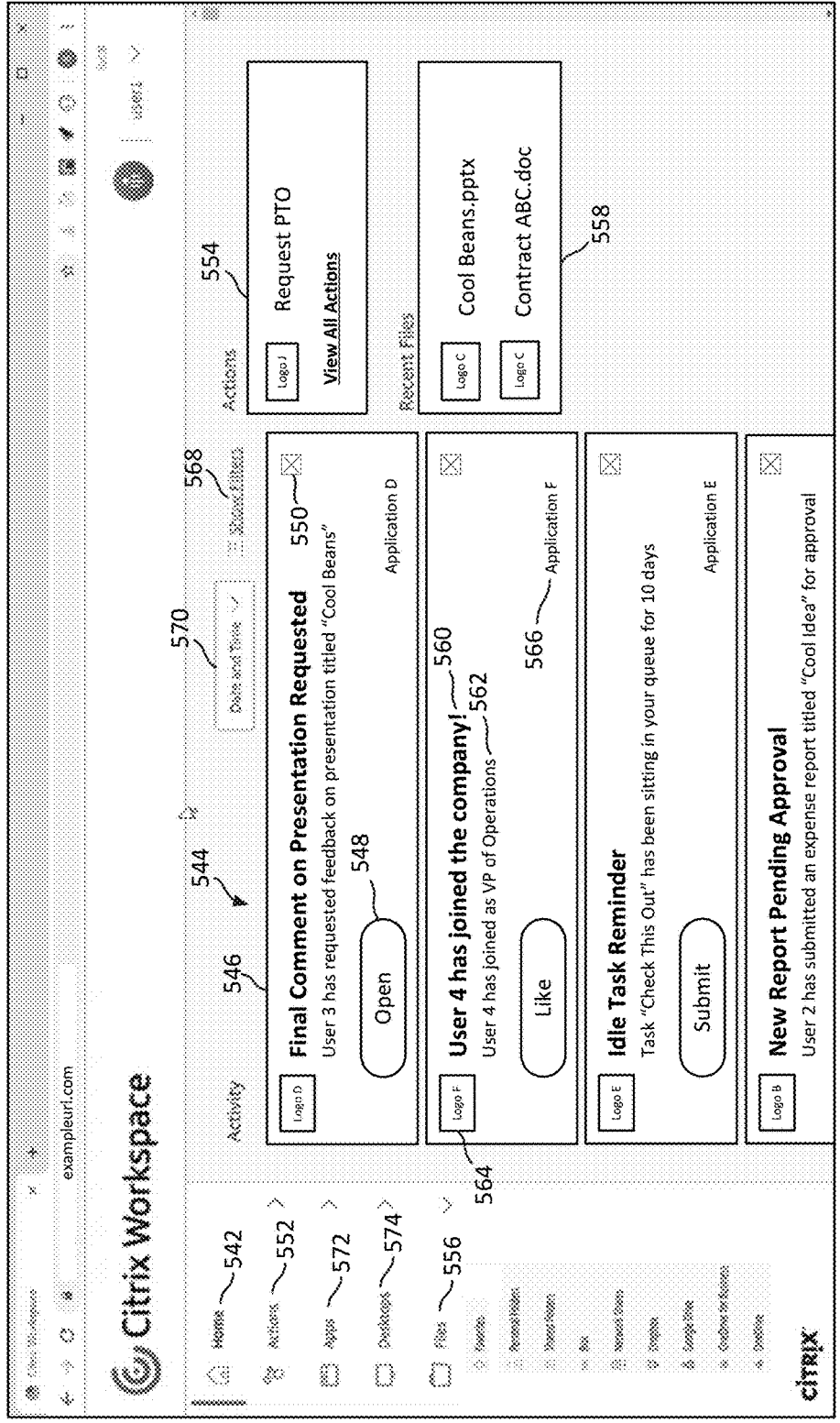
FIG. 5D shows how a display screen may appear when an intelligent activity feed feature of a multi-resource management system, such as that shown in FIG. 5C, is employed.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system or record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D), a "relevancy" mode (not illustrated) may be selected (e.g., using the element 570) in which the notifications may be sorted based on relevancy scores assigned to them by the analytics service 536, and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user-interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user-interface element 552 or by selecting a desired action from a list 554 of recently and/or commonly used microapp actions. As shown, additional resources may also be accessed through the screen 540 by clicking on or otherwise selecting one or more other user interface elements that may be presented on the screen. For example, in some embodiments, the user may also access files (e.g., via a Citrix ShareFile™ platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user-interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user-interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications.

Figure 6:
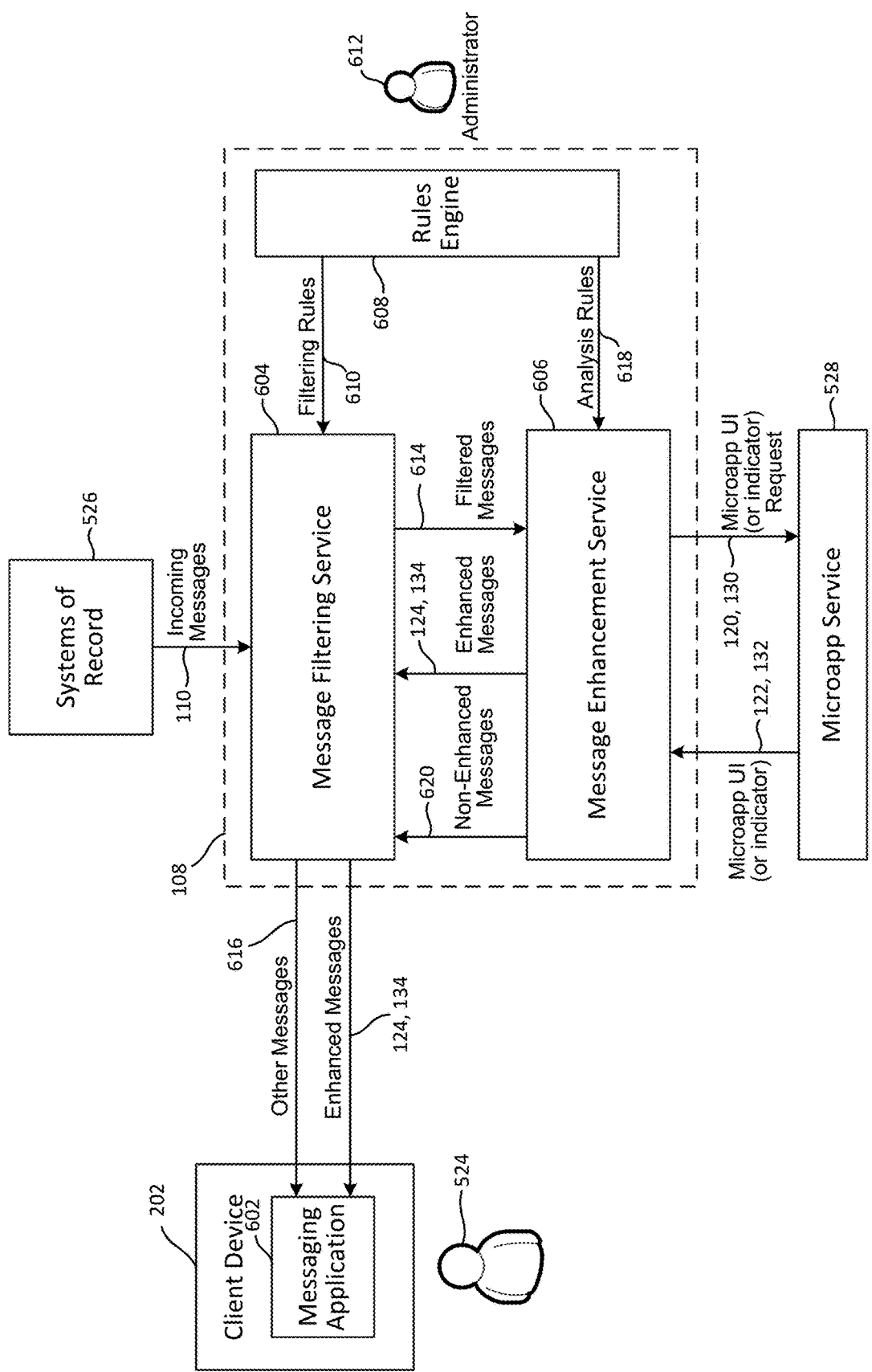
FIG. 6 is detailed description of the example system introduced in connection with FIGS. 1A-C.

F. Detailed Description of Example Embodiments of a System for Presenting Microapp User Interface Controls Based on Messages FIG. 6 shows an example implementation of the message processing service 108 introduced above in connection with FIGS. 1A-C. As described in Section A, in some implementations, the message processing service 108 may interact with (A) one or more systems of record 526, (B) a messaging application 602 (e.g., Citrix Secure Mail or another email client), and (C) the microapp service 528, to evaluate incoming messages 110 and, when appropriate, generate enhanced messages 124, 134 that may be sent to the messaging application 602 for presentation to a user 524 of a client device 202. As illustrated in FIG. 6, in some implementations, the message processing service 108 may include a message filtering service 604, a message enhancement service 606, and a rules engine 608. In some embodiments, the message filtering service 604, the message enhancement service 606, and rules engine 608 may be implemented by respective processors, or groups of processors, and associated computer-readable medium(s) that are encoded with instructions which, when executed by the processor(s), cause one or more computing systems to perform the functions described herein.

In some implementations, the message filtering service 604 may be embodied by an email server (e.g., a Microsoft Exchange server) that includes a plugin, e.g., a transport agent, that is configured to execute one or more filtering rules 610. The filtering rules 610 may, for example, be configured by a system administrator 612 via a user interface provided by one or more computing components that embody the rules engine 608. In some implementations, the filtering rules 610 may include one or more high-level rules for identifying incoming messages 110 that are to be intercepted by the message filtering service 604 and passed along to the message enhancement service 606, e.g., as filtered messages 614, for further processing. As one example, the system administrator 612 may configure the rules engine 608 to apply a filtering rule 610 specifying that any emails 102 that originate from a particular system of record 526 (e.g., based the "from" metadata 114) and that include the word "task" in the "subject" metadata 116 are to be intercepted and passed along to the message enhancement service 606 as filtered messages 614. In some implementations, incoming messages 110 that are addressed to the user 524 but that do not meet the criteria of the filtering rules 610 may be delivered to the messaging application, e.g., as other messages 616, without being intercepted and passed along to the message enhancement service 606 for further processing.

In some implementations, the message enhancement service 606 may be included within, or operate in conjunction with, the analytics service 536 described above in connection with FIG. 5C. The message enhancement service 606 may execute one or more analysis rules 618 (e.g., as configured by the system administrator 612 via the rules engine 608) against the filtered messages 614 received from the message filtering service 604 to determine whether the filtered messages 614 relate to one or more actions that can be taken with respect to the systems of record 526 from which they originated. As noted previously, messages that meet such criteria may be referred to as "actionable" messages.

In the event that the message enhancement service 606 determines that a filtered message 614 is actionable, the message enhancement service 606 may send a request 120, 130 to the microapp service 528 for UI controls, e.g., microapp UI elements 106a, 106b (as described above in connection with FIG. 1B), or an indicator of the same (as described above in connection with FIG. 1C), that can be embedded within the filtered message 614 to allow the user 524 to seamlessly take the indicated action(s). In some implementations, the analysis rules 618 may be configured to recognize particular patterns of data and/or metadata within incoming messages 110 as corresponding to particular actions (or categories of actions, e.g., a "PTO request" category may imply both "approve" and "deny" actions) that may be taken with respect to particular systems of record 526, and may identify those actions (or categories) in the request 120, 130. In response, the microapp service 528 may return (e.g., via a response 122, 132) the applicable microapp UI elements 106 and/or a UI window that includes such microapp UI elements 106 (as described above in connection with FIG. 1B), or an indicator of the same (as described above in connection with FIG. 1C).

For the filtered messages 614 for which microapp UI controls (or an indicator of the same) are obtained from the microapp service 528, the message enhancement service 606 may embed the received microapp UI controls (or indicator) in those messages to generate enhanced messages 124, 134. As shown in FIG. 6, the message enhancement service 606 may send those enhanced messages to the message filtering service 604 (e.g., an email server) for delivery to an appropriate messaging application 602. The recipient messaging application 602 may then render the enhanced messages 124, 134 so as to include one or more microapp UI elements 106 (e.g., as included in the enhancement 104 shown in FIG. 1A) that are selectable to cause the microapp service 528 to take particular actions with respect to particular systems of record 526 on behalf of users.

For the filtered messages 614 that the message enhancement service 606 determines do not satisfy the criteria of the analysis rules 618, the message enhancement service 606 may return those messages, e.g., as non-enhanced messages 620, to the message filtering service 604 (e.g., an email server) for delivery to an appropriate messaging application 602.

Figure 7A:
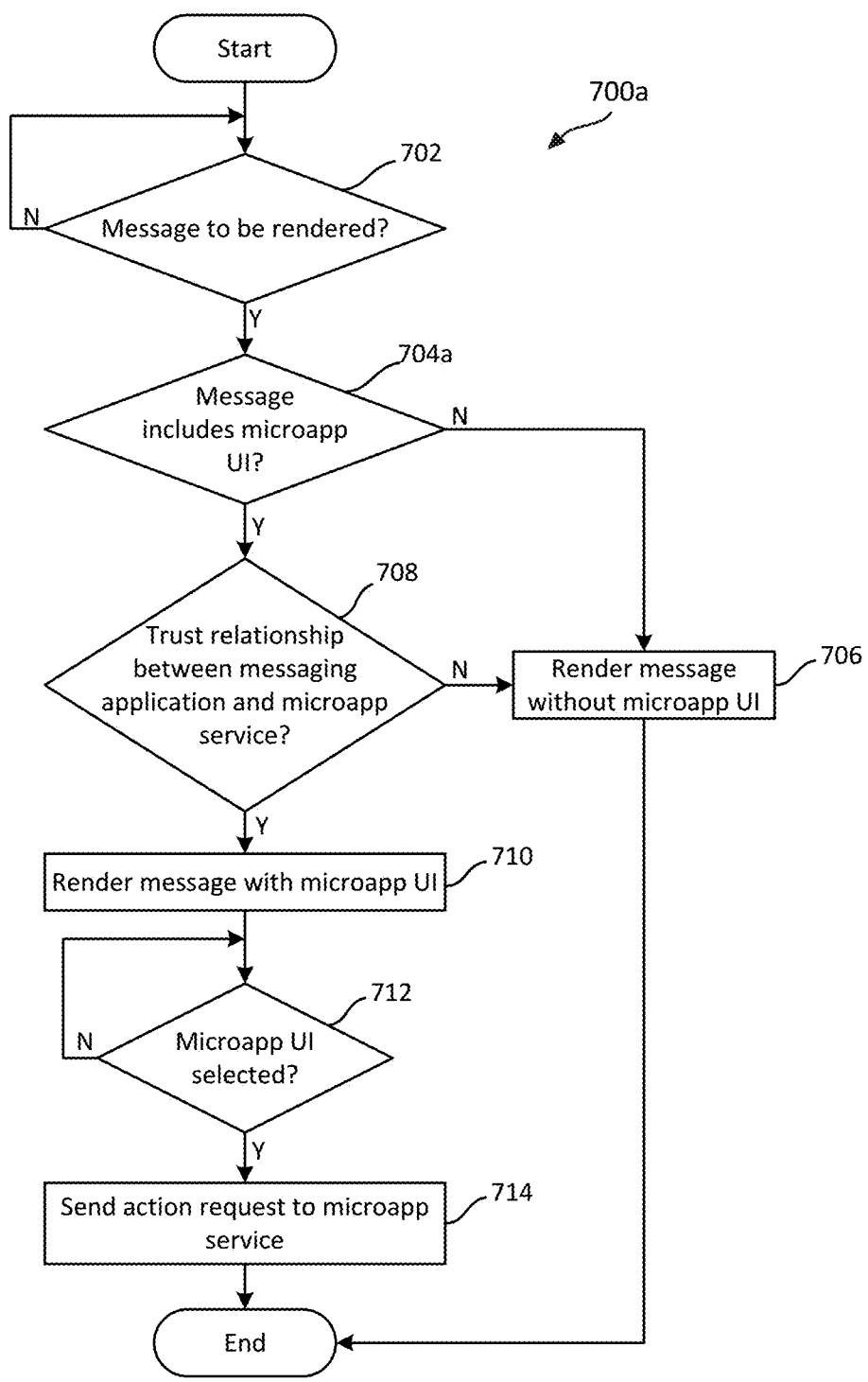
FIG. 7A is a first example routine that may be employed by the messaging application shown in FIG. 6.

FIG. 7A shows a first example routine 700a that may be executed by the messaging application 602 shown in FIG. 6 in an implementation in which received enhanced messages 124 include one or more microapp UI elements 106, such as described above in connection with FIG. 1B.

As shown, the routine 700a may begin at a decision step 702, when the messaging application 602 determines that a received message is to be rendered for display on the client device 202. The messaging application 602 may determine to render a message, for example, in response to the user 524 selecting an email message within the user's email in-box.

At a decision step 704, the messaging application 602 may determine whether the message to be rendered includes one or more microapp UI elements 106. When, at the decision step 704, the messaging application determines that the message does not include any microapp UI elements 106, the routine 700a may proceed to a step 706, at which the message may be recognized as one of the other messages 616 shown in FIG. 6, and may be rendered as a standard message without an enhancement 104. When, on the other hand, the messaging application determines (at the decision step 704) that the message does include one or more microapp UI elements 106, the routine 700a may instead proceed to a decision step 708, at which the messaging application 602 may determine whether a trust relationship exists between the messaging application 602 and the microapp service 528. In some implementations, the messaging application 602 may determine such a trust relationship exists by determining that the user 524 is authorized to use both applications, such as through the use of the single-sign on service 520 shown in FIG. 5B. In other implementations, such a trust relationship may be established by other means, such as by having the user separately enter authorization credentials for the microapp service 528 and the messaging application 602, or otherwise.

When, at the decision step 708, the messaging application 602 determines that a trust relationship between the messaging application 602 and the microapp service 528 has not been established, the routine 700a may proceed to the step 706 (discussed above), at which the messaging application 602 may render the message as a standard message without one or more selectable microapp UI elements 106. In some implementations, the UI controls that were embedded in the message by the message enhancement service 606 may be removed from the message entirely. In other implementations, an indication of the UI controls may remain in the message but may be disabled, e.g., by being made non-selectable, and may be greyed out or otherwise indicated as being inactive. When, on the other hand, the messaging application 602 determines (at the decision step 708) that a trust relationship does exist between the messaging application 602 and the microapp service 528, the routine 700a may instead proceed to a step 710, at which the messaging application 602 may render the message so as to include the selectable microapp UI elements 106 that were embedded in the message by the message enhancement service 606.

At a decision step 712, the messaging application 602 may determine whether one of the rendered microapp UI elements 106 has been selected.

When, at the decision step 712, the messaging application 602 determines that a microapp UI element 106 has been selected, the routine 700a may proceed to a step 714, at which the messaging application 602 may send an indication 126 of the selected microapp UI element 106 to the microapp service 528 for processing, as illustrated in FIG. 1B. In some implementations, the messaging application 602 may thereafter grey out or otherwise indicate the microapp UI elements 106 in the message as inactive, so that the user 524 knows that an action has already been taken with respect to the system of record 526.

Figure 7B:
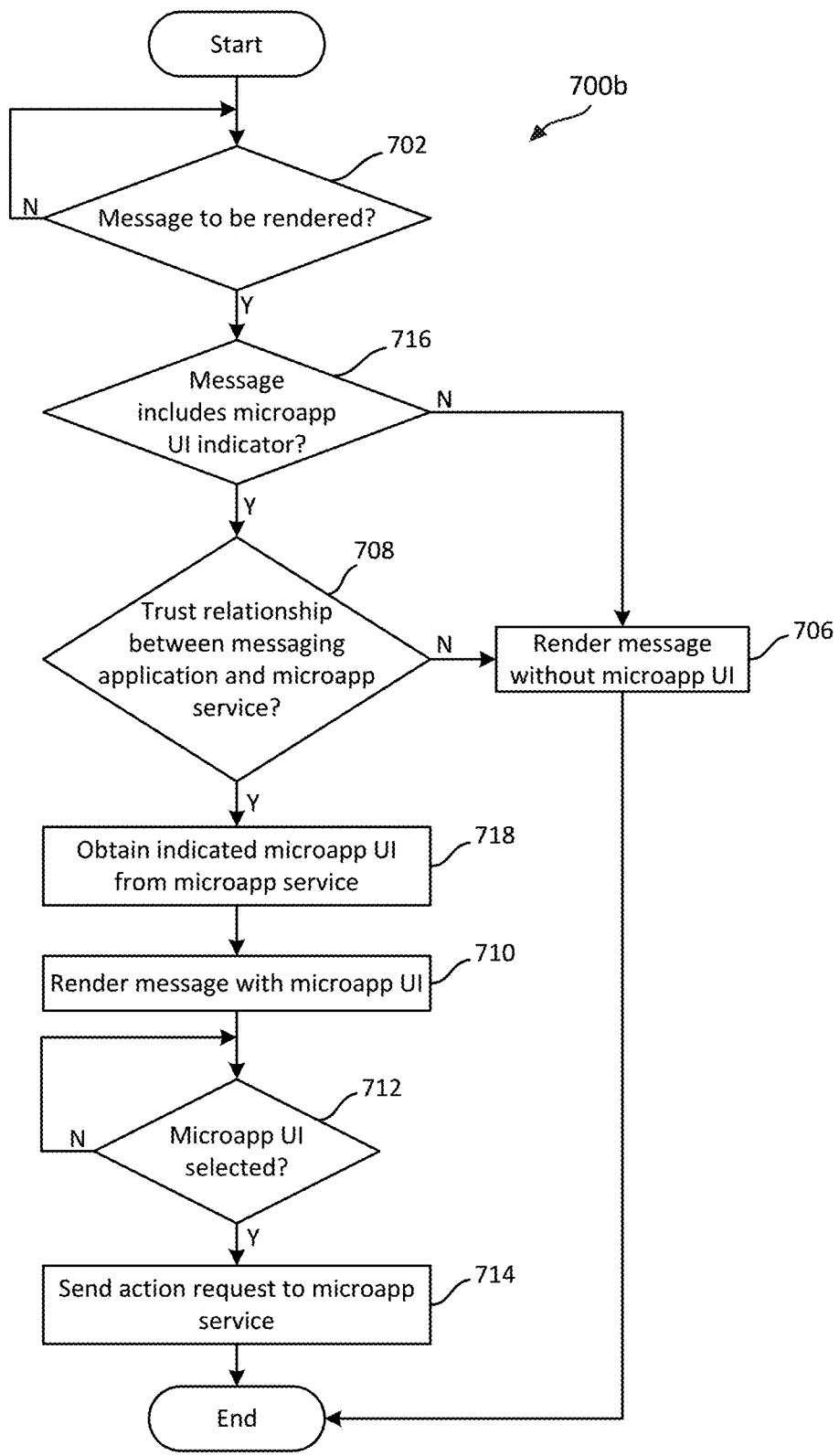
FIG. 7B is a second example routine that may be employed by the messaging application shown in FIG. 6.

FIG. 7B shows a second example routine 700b that may be executed by the messaging application 602 shown in FIG. 6 in an implementation in which received enhanced messages 124 include one or more microapp UI indicators, rather than microapp UI elements 106 themselves, such as described above in connection with FIG. 1C.

The routine 700b is identical to the routine 700a, with two exceptions. First, in lieu of the decision step 704 of the routine 700a (at which the messaging application 602 determines whether the message to be rendered includes one or more microapp UI elements 106), the routine 700b includes a decision step 716, at which the messaging application 602 instead determines whether the message to be rendered includes one or more indicators of microapp UI elements 106. Second, following a determination at the step 708 that a trust relationship exists between the messaging application 602 and the microapp service 528, the messaging application 602 may perform an additional step 718, pursuant to which the messaging application 602 may obtain from the microapp service 528 one or microapp UI elements 106 corresponding to the one or more microapp UI indicators 132 that were embedded in the enhanced message 134 by the message enhancement service 606. As shown in FIG. 1C, for example, the messaging application 602 may send a request 136 for the indicated microapp UI elements 106 to the microapp service 528, and the microapp service 528 may return a response 122 that includes the microapp UI element(s) 106 identified by the indicator(s) 132 in the request 136.

Figure 8:
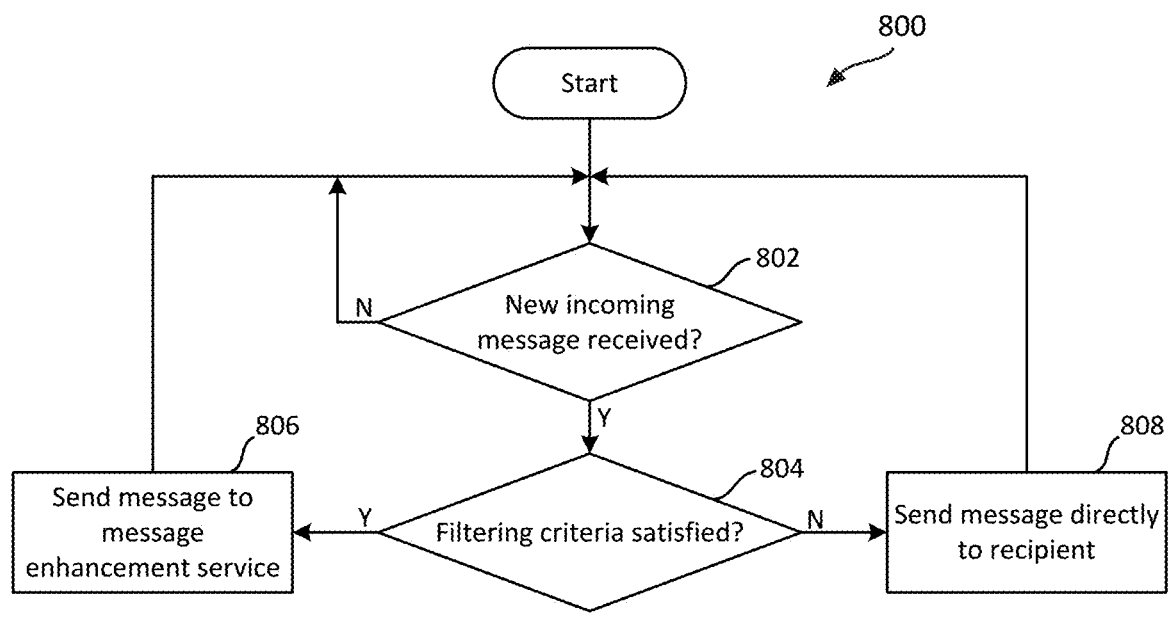
FIG. 8 is an example routine that may be employed by the message filtering service shown in FIG. 6.

FIG. 8 shows an example routine 800 that may be implemented by the message filtering service 604 show in FIG. 6. As noted previously, in some implementations, the message filtering service 604 may be embodied by an email server (e.g., a Microsoft Exchange server) that includes a plugin, e.g., a transport agent, that is configured to execute one or more filtering rules 610.

As shown, the routine 800 may begin at decision step 802 when the message filtering service 604 determines that a new incoming message 110 has been received. Upon receipt of a new incoming message 110, the routine 800 may proceed to a decision step 804, at which the message filtering service 604 may determine whether the filtering criteria set by filtering rules 610 are satisfied for the newly-received message.

When, at the decision step 804, the message filtering service 604 determines that the filtering criteria are satisfied for an incoming message 110, the routine may proceed to a step 806, at which the incoming message 110 may be sent (as a filtered message 614) to the message enhancement service 606 for further processing, as described above. When, on the other hand, the message filtering service 604 determines (at the decision step 804) that the filtering criteria are not satisfied, the routine may instead proceed to a step 808, at which the incoming message 110 may be sent directly to its intended recipient, e.g., as one of the other messages 616.

Figure 9:
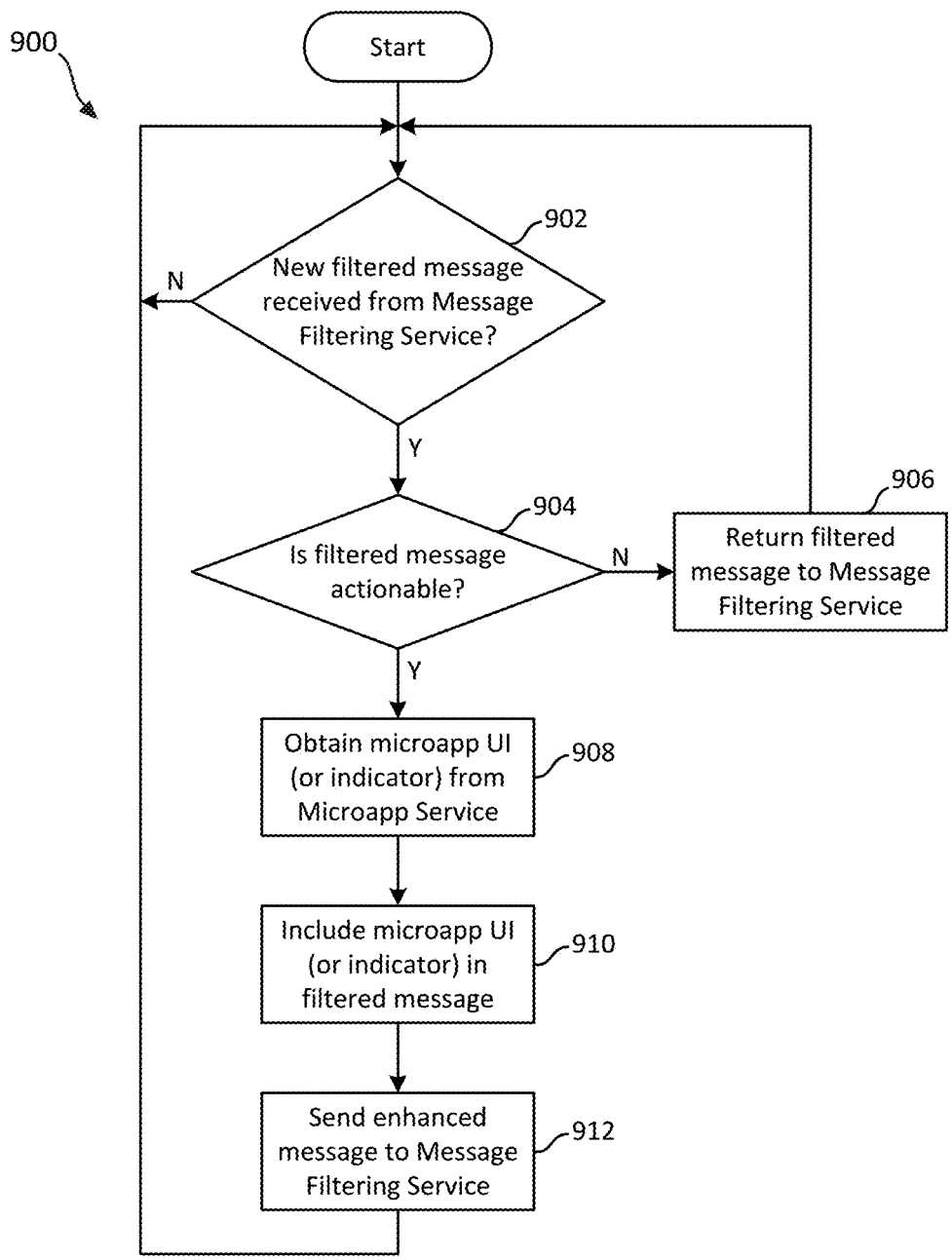
FIG. 9 is an example routine that may be employed by the message enhancement service shown in FIG. 6.

FIG. 9 shows an example routine 900 that may be performed by the message enhancement service 606 shown in FIG. 6. As noted previously, in some implementations, the message enhancement service 606 may be included within, or operate in conjunction with, the analytics service 536 described above in connection with FIG. 5C.

As shown, the routine 900 may begin at a decision step 902 when the message enhancement service 606 determines that a new filtered message 614 has been received from the message filtering service 604. Upon receipt of a new filtered message 614, the routine 900 may proceed to a decision step 904, at which the message enhancement service 606 may examine the filtered message 614, e.g., as indicated by the analysis rules 618, to determine whether the data and/or metadata of the filtered message 614 is indicative of one or more actions that a user 524 might want to take with respect to the system of record 526 from which the filtered message 614 originated. When, at the decision step 904, the message enhancement service 606 determines that the received filtered message 614 is not actionable, the routine 900 may proceed to a step 906, at which the filtered message 614 may be returned, e.g., as a non-enhanced message 620, to the message filtering service 604 for distribution to its intended recipient, e.g., as one of the other messages 616. When, on the other hand, the message enhancement service 606 determines (at the decision step 904) that the received filtered message 614 is actionable, the routine 900 may instead proceed to a step 908, at which the message enhancement service 606 may obtain one or more appropriate microapp UI elements 106 from the microapp service 528. As noted previously, in some implementations, the message enhancement service 606 may send a request 120, 130 to the microapp service 528 for microapp UI controls, e.g., microapp UI elements 106a, 106b (as described above in connection with FIG. 1B), or an indicator of the same (as described above in connection with FIG. 1C), and may receive a response 122, 132 from the microapp service 528 that includes the applicable microapp UI elements 106 and/or a UI window that includes such microapp UI elements 106 (as described above in connection with FIG. 1B), or an indicator of the same (as described above in connection with FIG. 1C).

At a step 910, the message enhancement service 606 may include the received microapp UI element(s) 106 (or indicator(s) of the same) in the filtered message 614 to generate an enhanced message 124, 134.

At a step 912, the message enhancement service 606 may send the generated enhanced message 124, 134 to the message filtering service 604 for distribution to the messaging application 602 of the client device 202.

As noted previously, it should be appreciated that, in some implementations, some or all of the above-described functionality of the message filtering service 604 and/or the message enhancement service 606 to identify actionable messages and/or to determine appropriate microapp UI controls to embed within such messages may reside at the client device 202, rather than at one or more servers 204. For example, in some implementations, the messaging application 602 may be configured to identify potentially actionable messages by performing a first level of analysis on newly-received messages (e.g., by applying the filtering rules 610), and may send those potentially actionable messages to the message enhancement service 606 for further analysis to determine whether is appropriate for the messaging application 602 to present one or more selectable microapp UI elements 106. For individual messages the message enhancement service 606 determines are actionable, the message enhancement service 606 may, for example, embed one or more microapp UI elements 106 (or indicators of the same) in an enhanced message 124, 134 sent back to the messaging application 602 for rendering (e.g., using the process described above) and/or may instruct the messaging application 602 to present the applicable microapp UI controls in some other manner, such as by presenting a pop-up window, or by indicating options for selecting the microapp UI controls in a toolbar or other widget of the messaging application. Such an implementation may be particular useful for certain types of messages, such as SMS messages. For instance, in some implementations, the messaging application 602 may be given permission to "listen" to incoming SMS messages, and may send the content of newly-received SMS messages meeting one or more threshold criteria to the message enhancement service 606 for further processing, as just described.

G. Example Implementations of Methods, Systems, and Computer-Readable Media in Accordance with the Present Disclosure The following paragraphs (M1) through (M11) describe examples of methods that may be implemented in accordance with the present disclosure.

(M1). A method may be performed that involves determining, by a computing system, that a first message sent by a system of record for delivery to a client device is indicative of a first action that can be taken with respect to the system of record; determining, by the computing system, at least one user interface (UI) element that is selectable to cause the system of record to take the first action; and generating, by the computing system and based at least in part on the first message being indicative of the first action, at least one command that causes the client device to present the at least one UI element.

(M2). A method may be performed as described in paragraph (M1), and may further involve intercepting, by the computing system, the first message before the first message is presented by the client device; and embedding, by the computing system, first data indicative of the at least one UI element into the first message to generate an enhanced message for presentation by the client device.

(M3). A method may be performed as described in paragraph (M2), wherein the computing system may comprise at least one first server configured to deliver messages addressed to a first account to the client device, and at least one second server configured to instruct the system of record to take the first action in response to receiving an indication that the at least one UI element has been selected, and the method may further involve sending, from the at least one second server to the at least one first server, the first data; and embedding, by the at least one first server, the first data into the first message to generate the enhanced message.

(M4). A method may be performed as described in paragraph (M3), wherein the at least one first server may comprise an email server and the first message may comprise an email message.

(M5). A method may be performed as described in any of paragraphs (M2) through (M4), and may further involve configuring the first data to cause an application executing under control of the client device to render the at least one UI element.

(M6). A method may be performed as described in any of paragraphs (M2) through (M4), and may further involve configuring the first data to cause an application executing under control of the client device to retrieve second data representing at least one UI element from the computing system and to render to at least one UI element using the second data.

(M7). A method may be performed as described in any of paragraphs (M2) through (M6), wherein the first message may be an email message.

(M8). A method may be performed as described in any of paragraphs (M2) through (M6), wherein the first message may be a short message service (SMS) message.

(M9). A method may be performed as described in paragraph (M8), wherein the computing system may be configured to deliver messages addressed to a first account to the client device, and the method may further involve accessing, by an application executing under control of the client device, content of the SMS message; sending, from the client device to the computing system, the content of the SMS message; and determining that the first message is indicative of the first action that can be taken with respect to the system of record at least in part by determining that the content of the SMS message is indicative of the first action that can be taken with respect to the system of record.

(M10). A method may be performed as described in paragraph (M8) or paragraph (M9), and may further involve embedding, by the computing system, an indication of the at least one UI element into a second message that is addressed to the first account to generate an enhanced message; and sending, from the computing system to the client device, the enhanced message.

(M11). A method may be performed as described in any of paragraphs (M1) through (M10), and may further involve receiving, by the computing system and from the client device, an indication that the at least one UI element has been selected; and in response to receiving the indication, instructing, by the computing system, the system of record to take the first action.

The following paragraphs (S1) through (S11) describe examples of systems and devices that may be implemented in accordance with the present disclosure.

(S1). A system may comprise at least one processor and at least one computer-readable medium encoded with instructions which, when executed by the at least one processor, cause the system to determine that a first message sent by a system of record for delivery to a client device is indicative of a first action that can be taken with respect to the system of record, to determine at least one user interface (UI) element that is selectable to cause the system of record to take the first action, and to generate, based at least in part on the first message being indicative of the first action, at least one command that causes the client device to present the at least one UI element.

(S2). A system may be configured as described in paragraph (S2), and the at least one the at least one computer-readable medium may be further encoded with additional instructions which, when executed by the at least one processor, further cause the system to intercept the first message before the first message is presented by the client device, and to embed first data indicative of the at least one UI element into the first message to generate an enhanced message for presentation by the client device.

(S3). A system may be configured as described in paragraph (S2), wherein the at least one processor may comprise at least one first processor configured to deliver messages addressed to a first account to the client device, and at least one second processor configured to instruct the system of record to take the first action in response to receiving an indication that the at least one UI element has been selected; and the at least one computer-readable medium may comprise at least one second computer-readable medium encoded with instructions which, when executed by the at least one second processor, cause the at least one second processor to send the first data to the at least one first processor, and at least one first computer-readable medium which, when executed by the at least one first processor, cause the at least one first processor to embed the first data into the first message to generate the enhanced message.

(S4). A system may be configured as described in paragraph (S3), and the at least one first processor may be included in at least one email server and the first message may comprise an email message.

(S5). A system may be configured as described in any of paragraphs (S2) through (S4), and the at least one the at least one computer-readable medium may be further encoded with additional instructions which, when executed by the at least one processor, further cause the system to configure the first data to cause an application executing under control of the client device to render the at least one UI element.

(S6). A system may be configured as described in any of paragraphs (S2) through (S4), and the at least one the at least one computer-readable medium may be further encoded with additional instructions which, when executed by the at least one processor, further cause the system to configure the first data to cause an application executing under control of the client device to retrieve second data representing at least one UI element from the system and to render to at least one UI element using the second data.

(S7). A system may be configured as described in any of paragraphs (S2) through (S6), wherein the first message may be an email message.

(S8). A system may be configured as described in any of paragraphs (S2) through (S6), wherein the first message may be a short message service (SMS) message.

(S9). A system may be configured as described in paragraph (S8), and may be further configured to deliver messages addressed to a first account to the client device, wherein the at least one the at least one computer-readable medium may be further encoded with additional instructions which, when executed by the at least one processor, further cause the system to receive content of the SMS message from an application executing under control of the client device, and to determine that the first message is indicative of the first action that can be taken with respect to the system of record at least in part by determining that the content of the SMS message is indicative of the first action that can be taken with respect to the system of record.

(S10). A system may be configured as described in paragraph (S8) or paragraph (S9), and the at least one the at least one computer-readable medium may be further encoded with additional instructions which, when executed by the at least one processor, further cause the system to embed an indication of the at least one UI element into a second message that is addressed to the first account to generate an enhanced message, and to send the enhanced message to the client device.

(S11). A system may be configured as described in any of paragraphs (S1) through (S10), and the at least one the at least one computer-readable medium may be further encoded with additional instructions which, when executed by the at least one processor, further cause the system to receive, from the client device, an indication that the at least one UI element has been selected, and, in response to receiving the indication, to instruct the system of record to take the first action.

The following paragraphs (CRM1) through (CRM11) describe examples of computer-readable media that may be implemented in accordance with the present disclosure.

(CRM1). At least one non-transitory computer-readable medium may be encoded with instructions which, when executed by at least one processor of a system, cause the system to determine that a first message sent by a system of record for delivery to a client device is indicative of a first action that can be taken with respect to the system of record, to determine at least one user interface (UI) element that is selectable to cause the system of record to take the first action, and to generate, based at least in part on the first message being indicative of the first action, at least one command that causes the client device to present the at least one UI element.

(CRM2). At least one non-transitory computer-readable medium may be configured as described in paragraph (CRM2), and may be further encoded with additional instructions which, when executed by the at least one processor, further cause the system to intercept the first message before the first message is presented by the client device, and to embed first data indicative of the at least one UI element into the first message to generate an enhanced message for presentation by the client device.

(CRM3). At least one non-transitory computer-readable medium may be configured as described in paragraph (CRM2), wherein the at least one processor may comprise at least one first processor configured to deliver messages addressed to a first account to the client device, and at least one second processor configured to instruct the system of record to take the first action in response to receiving an indication that the at least one UI element has been selected; and the at least one computer-readable medium may comprise at least one second computer-readable medium encoded with instructions which, when executed by the at least one second processor, cause the at least one second processor to send the first data to the at least one first processor, and at least one first computer-readable medium which, when executed by the at least one first processor, cause the at least one first processor to embed the first data into the first message to generate the enhanced message.

(CRM4). At least one non-transitory computer-readable medium may be configured as described in paragraph (CRM3), and the at least one first processor may be included in at least one email server and the first message may comprise an email message.

(CRM5). At least one non-transitory computer-readable medium may be configured as described in any of paragraphs (CRM2) through (CRM4), and may be further encoded with additional instructions which, when executed by the at least one processor, further cause the system to configure the first data to cause an application executing under control of the client device to render the at least one UI element.

(CRM6). At least one non-transitory computer-readable medium may be configured as described in any of paragraphs (CRM2) through (CRM4), and may be further encoded with additional instructions which, when executed by the at least one processor, further cause the system to configure the first data to cause an application executing under control of the client device to retrieve second data representing at least one UI element from the system and to render to at least one UI element using the second data.

(CRM7). At least one non-transitory computer-readable medium may be configured as described in any of paragraphs (CRM2) through (CRM6), wherein the first message may be an email message.

(CRM8). At least one non-transitory computer-readable medium may be configured as described in any of paragraphs (CRM2) through (CRM6), wherein the first message may be a short message service (SMS) message.

(CRM9). At least one non-transitory computer-readable medium may be configured as described in paragraph (CRM8), wherein the system may be further configured to deliver messages addressed to a first account to the client device, and the at least one the at least one computer-readable medium may be further encoded with additional instructions which, when executed by the at least one processor, further cause the system to receive content of the SMS message from an application executing under control of the client device, and to determine that the first message is indicative of the first action that can be taken with respect to the system of record at least in part by determining that the content of the SMS message is indicative of the first action that can be taken with respect to the system of record.

(CRM10). At least one non-transitory computer-readable medium may be configured as described in paragraph (CRM8) or paragraph (CRM9), and may be further encoded with additional instructions which, when executed by the at least one processor, further cause the system to embed an indication of the at least one UI element into a second message that is addressed to the first account to generate an enhanced message, and to send the enhanced message to the client device.

(CRM11). At least one non-transitory computer-readable medium may be configured as described in any of paragraphs (CRM1) through (CRM10), and may be further encoded with additional instructions which, when executed by the at least one processor, further cause the system to receive, from the client device, an indication that the at least one UI element has been selected, and, in response to receiving the indication, to instruct the system of record to take the first action.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
    receiving, by a first computing system and from a remote system of record via a network, a first message that the remote system of record sent via the network for delivery to a client device, wherein the first message is intercepted by the first computing system before the first message is presented by the client device;
    determining, by the first computing system, that the first message received from the remote system of record via the network is indicative of a first action that a second computing system is configured to take with respect to the remote system of record;
    receiving, by the first computing system and from the second computing system via the network, first data indicative of at least one user interface (UI) element that is selectable to cause the second computing system to take the first action with respect to the remote system of record, the at least one UI element having been absent from the first message when the remote system of record sent the first message via the network;
    embedding, by the first computing system and based at least in part on the first message being indicative of the first action, the first data into the first message to generate an enhanced message for presentation by the client device; and
    sending, from the first computing system to the client device via the network, the enhanced message to cause the client device to present the at least one UI element, wherein the first data is configured to cause an application executing under control of the client device to retrieve second data representing the at least one UI element from the second computing system and to render the at least one UI element using the second data.

2. A method, comprising:
    receiving, by a first computing system and from a remote system of record via a network, a first message that the remote system of record sent via the network for delivery to a client device, wherein first computing system comprises at least one first server configured to deliver messages addressed to a first account to the client device, and wherein the first message is intercepted by the first computing system before the first message is presented by the client device;
    determining, by the first computing system, that the first message received from the remote system of record via the network is indicative of a first action that a second computing system is configured to take with respect to the remote system of record, wherein the second computing system comprises at least one second server configured to instruct the remote system of record to take the first action in response to receiving an indication that at least one user interface (UI) element has been selected, the at least one UI element having been absent from the first message when the remote system of record sent the first message via the network;

based at least in part on the first message being indicative of the first action, sending, from the at least one first server to the at least one second server, a request for first data indicative of the at least one UI element;

receiving, by the first computing system and from the second computing system via the network, the first data;

embedding, by the first computing system and based at least in part on the first message being indicative of the first action, the first data into the first message to generate an enhanced message for presentation by the client device; and sending, from the first computing system to the client device via the network, the enhanced message to cause the client device to present the at least one UI element.

3. The method of claim 2, wherein the at least one first server comprises an email server and the first message comprises an email message.

4. The method of claim 2, further comprising:
configuring the first data to cause an application executing under control of the client device to render the at least one UI element.

5. The method of claim 2, further comprising:
configuring the first data to cause an application executing under control of the client device to retrieve second data representing at least one UI element from the second computing system and to render to at least one UI element using the second data.

6. The method of claim 1, wherein the first message is an email message.

7. A method, comprising:
receiving, by a first computing system and from a client device via a network, content of a first short message service (SMS) message that a remote system of record sent to the client device, the client device having accessed the content of the first SMS message using an application executing under control of the client device;

determining, by the first computing system, that the content of the first SMS message is indicative of a first action that a second computing system is configured to take with respect to the remote system of record;

receiving, by the first computing system and from the second computing system via the network, first data indicative of at least one user interface (UI) element that is selectable to cause the second computing system to take the first action with respect to the remote system of record, the at least one UI element having been absent from the first SMS message when the remote system of record sent the first SMS message to the client device; and generating, by the first computing system and based at least in part on the first data and the content of the first SMS message being indicative of the first action, at least one command that causes the client device to present the at least one UI element.

8. The method of claim 7, further comprising:
embedding, by the first computing system, an indication of the at least one UI element into a second SMS message to generate an enhanced SMS message; and
sending, from the first computing system to the client device, the enhanced SMS message to cause the client device to present the at least one UI element.

9. The method of claim 2, further comprising:
receiving, by the second computing system and from the client device, an indication that the at least one UI element has been selected; and
in response to receiving the indication, instructing, by the second computing system, the remote system of record to take the first action.

10. A first computing system, comprising:
at least one first processor; and
at least one first computer-readable medium encoded with instructions which, when executed by the at least one first processor, cause the first computing system to:
receive, from a remote system of record via a network, a first message that the remote system of record sent via the network for delivery to a client device, wherein the first message is intercepted by the first computing system before the first message is presented by the client device,
determine that the first message received from the remote system of record via the network is indicative of a first action that a second computing system is configured to take with respect to the remote system of record,
receive, from the second computing system via the network, first data indicative of at least one user interface (UI) element that is selectable to cause the second computing system to take the first action with respect to the remote system of record, the at least one UI element having been absent from the first message when the remote system of record sent the first message via the network,
embed, based at least in part on the first message being indicative of the first action, the first data into the first message to generate an enhanced message for presentation by the client device, and
send, to the client device via the network, the enhanced message to cause the client device to present the at least one UI element, wherein the first data is configured to cause an application executing under control of the client device to retrieve second data representing the at least one UI element from the second computing system and to render the at least one UI element using the second data.

11. A first computing system, comprising:
at least one first processor; and
at least one first computer-readable medium encoded with instructions which, when executed by the at least one first processor, cause the first computing system to:
receive, from a remote system of record via a network, a first message that the remote system of record sent via the network for delivery to a client device, wherein the first computing system is configured to deliver messages addressed to a first account to the client device, and wherein the first message is intercepted by the first computing system before the first message is presented by the client device,
determine that the first message received from the remote system of record via the network is indicative of a first action that a second computing system is configured to take with respect to the remote system of record, wherein the second computing system is configured to instruct the remote system of record to take the first action in response to receiving an indication that at least one user interface (UI) element has been selected, the at least one UI element having been absent from the first message when the remote system of record sent the first message via the network, based at least in part on the first message being indicative of the first action, send, to the second computing system via the network, a request for first data indicative of the at least one UI element, receive, from the second computing system via the network, the first data, embed, based at least in part on the first message being indicative of the first action, the first data into the first message to generate an enhanced message for presentation by the client device, and send, to the client device via the network, the enhanced message to cause the client device to present the at least one UI element.

12. The first computing system of claim 11, wherein the at least one first processor is included in at least one email server and the first message comprises an email message.

13. The first computing system of claim 11, wherein the at least one first computer-readable medium is further encoded with additional instructions which, when executed by the at least one first processor, further cause the first computing system to:
configure the first data to cause an application executing under control of the client device to render the at least one UI element.

14. The first computing system of claim 11, wherein the at least one first computer-readable medium is further encoded with additional instructions which, when executed by the at least one first processor, further cause the first computing system to:
configure the first data to cause an application executing under control of the client device to retrieve second data representing at least one UI element from the second computing system and to render to at least one UI element using the second data.

15. The first computing system of claim 10, wherein the first message is an email message.

16. The first computing system of claim 11, in combination with the second computing system, wherein the second computing system comprises at least one second processor, and at least one second computer-readable medium encoded with instructions which, when executed by the at least one second processor, cause the second computing system to:
receive, from the client device, an indication that the at least one UI element has been selected; and
in response to receiving the indication, instruct the remote system of record to take the first action.

17. The method of claim 1, further comprising:
configuring the first data to cause an application executing under control of the client device to render the at least one UI element.

18. The method of claim 1, further comprising:
receiving, by the second computing system and from the client device, an indication that the at least one UI element has been selected; and
in response to receiving the indication, instructing, by the second computing system, the remote system of record to take the first action.

19. The first computing system of claim 10, wherein the at least one first computer-readable medium is further encoded with additional instructions which, when executed by the at least one first processor, further cause the first computing system to:
configure the first data to cause an application executing under control of the client device to render the at least one UI element.

20. The first computing system of claim 10, in combination with the second computing system, wherein the second computing system comprises at least one second processor, and at least one second computer-readable medium encoded with instructions which, when executed by the at least one second processor, cause the second computing system to:
receive, from the client device, an indication that the at least one UI element has been selected; and
in response to receiving the indication, instruct the remote system of record to take the first action.

* * * * *